Aug. 31, 1965     E. M. LAU     3,203,662
SLEEVE VALVE
Filed July 16, 1963
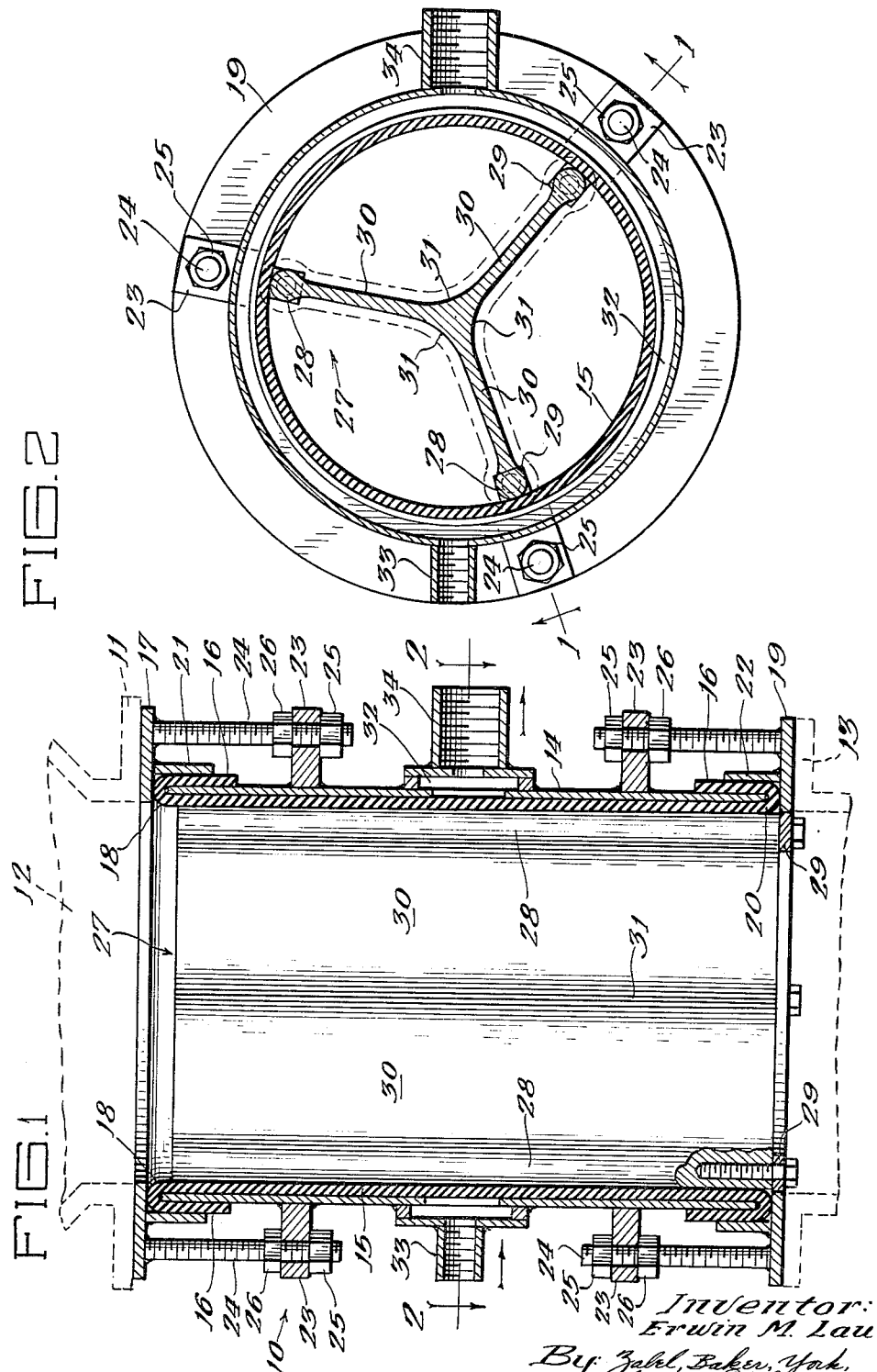
Inventor:
Erwin M. Lau
By: Zabel, Baker, York,
Jones & Dithmar
Attorney

United States Patent Office 3,203,662
Patented Aug. 31, 1965

3,203,662
SLEEVE VALVE
Erwin M. Lau, Dolton, Ill., assignor to Black Products Co., Chicago, Ill., a corporation of Illinois
Filed July 16, 1963, Ser. No. 295,347
8 Claims. (Cl. 251—5)

The present invention relates to a rubber sleeve valve for use in cutting off the flow of solid materials therethrough, such as granular, powdered or flaky materials, and is an improvement in the type of sleeve valve shown in my copending application, Serial No. 79,796, filed December 30, 1960, now Patent No. 3,103,300 granted September 10, 1963, of which the present application is a continuation-in-part.

In the sleeve valve disclosed in my aforesaid application a core was provided which comprised a plurality of peripherally located vertical core elements which divided the rubber sleeve into three separate extensible elements. One of the features of my earlier invention was that the construction was such that the sleeve could be fabricated from ordinary rubber tubing as contrasted with a specially molded rubber part, and in this connection, the sleeve was considerably longer than the cylindrical casing within which the sleeve is disposed, the ends of the sleeve being folded back over the outside of the casing, and the seal between the sleeve end and the casing was effected by top and bottom annular plates which bore on the fold of the sleeve with sufficient force to effect the desired seal. This force was developed by turnbuckles which drew the plates toward each other. The sleeve valve was adapted to be located between the upper end of the conditioning chamber of the bag filling machine and the lower end of a supply hopper, and the aforementioned annular plates were bolted to each.

In the customary installation, a supply hopper is independently supported by suitable framework. In other words, the bag filling machine and the cylindrical casing of the sleeve valve do not constitute the support for the supply hopper.

However, it has been found that when the supply hopper is loaded with several tons of the powdered or granular material the hopper supporting framework will flex in such a manner that a part of the weight of the material is taken up by the structure of the sleeve valve. This causes the top and bottom annular plates to bear against the fold of the rubber sleeve with a much greater force than intended, so much so in fact, that the additional force involved will cut through the sleeve at the fold.

The present invention is directed to a sleeve valve which avoids the above difficulties.

According to my invention, instead of using turnbuckles to draw the end plates toward each other, I use screw threaded means which effect a connection between the end plates and the cylindrical casing itself, the parts being so arranged that the screw threaded means will resist vertical compressive forces so that the additional force resulting from the load in the hopper will be transmitted from the top and bottom plates to the body of the cylindrical casing through the screw threaded means rather than through the rubber sleeve. As a result, the additional loading will not cut through or weaken the rubber sleeve, and the life of the latter is extended.

An additional feature of my invention is that the parts are so arranged that the sleeve valve may be contracted slightly in the vertical dimension so that the same may be slid laterally from between the hopper and the conditioning chamber for inspection, repair or replacement.

Other objects, features and advantages of my invention will become apparent as the description proceeds.

With reference now to the drawings in which like reference numerals designate like parts:

FIG. 1 is a vertical section showing a preferred embodiment of my invention, taken substantially along lines 1—1 of FIG. 2; and FIG. 2 is a plan section taken along line 2—2 of FIG. 1.

In FIG. 1, the sleeve valve 10 is located between the flange 11 of a supply hopper 12 and a flange 13 of the conditioning chamber of a bag filling machine, not shown, the parts 11, 12 and 13 being shown in broken lines.

The sleeve valve 10 comprises a cylindrical casing 14 and a rubber sleeve 15 disposed within the casing 14 and of substantially the same diameter when in its relaxed position. The sleeve 15 is of a length greater than the height of the casing 14 so as to provide end portions 16 which are folded over the ends of the casing 14 in the manner shown. The end edges of the casing 14 may be rounded and polished to provide a smooth surface which will not cut into the rubber of the sleeve.

A top annular plate 17 overlies the upper fold 18 of the sleeve, and a bottom annular plate 19 underlies the bottom fold 20 of the sleeve. These plates have cylindrical flanges 21 and 22 respectively which encircle the two end portions 16 of the sleeve.

The means for drawing the plates 17 and 19 toward each other and into engagement with the two folds 18 and 20 respectively, in order to provide a gas tight seal between the ends of the casing 14 and the sleeve 15, will now be described.

Lugs 23, suitably welded to the casing 14, project radially from the outer surface thereof, as shown in FIGS. 1 and 2. There are two sets of these lugs, one for each of the plates 17 and 19, and there are preferably three lugs in each set located 120° apart.

Studs 24 are welded to the bottom surface of the top plate 17 and to the top surface of bottom plate 19. These studs extend downwardly and upwardly respectively, and are parallel to the axis of the cylindrical casing 14, and each stud 24 extends through a corresponding lug 23. Nuts 25 are provided for each stud for drawing the top plate 17 downwardly and the bottom plate 19 upwardly against the resilience of the folds 18 and 20 respectively, of the rubber sleeve 15.

Care must be exercised to insure that the plates are not drawn toward the casing with sufficient force as to cut through the sleeve, and in this connection, the nuts are tightened to a uniform extent by means of a torque wrench which, in the instant case, is set to develop a maximum of 120-inch pounds.

On each stud is also located a lock nut 26, between the lug 23 and its associated top or bottom plate, and this lock nut 26 is tightened up against the lug 24 in such a manner as to serve as a stop, preventing any downward movement of the top plate 17, or upward movement of the bottom plate 19 respectively.

Thus, when the sleeve valve 10 is located between and bolted to the flanges 11 and 13, any increase in the load of the hopper, even though very substantial in magnitude, will not cause the top and bottom plates 17 and 19 to bear against the folds 18 and 20 with any greater force than that which is developed by the nuts 25 and the torque wrench. As a result, the life of the sleeve is extended many times over the sleeve shown in my aforesaid copending application where the valve is used in the environment described herein.

When it is desired to remove the sleeve valve 10 for inspection, and this is preferably done at a time when the supply hopper 12 is substantially empty, the lock nuts 26 are first backed off, and then the draw nuts 25 are tightened up so as to draw the plates 17 and 19 together sufficiently as to permit sideways removal of the sleeve valve from between the flanges 11 and 13. Preferably, the flanges 11 and 13, and the contacting surfaces of the top and bottom plates 17 and 19 are machined so that only a very slight tightening of the draw nuts 25, such as a half turn, is required to contract the over-all length sufficiently as to permit withdrawal. If desired, a torque wrench may be utilized to effect this operation, in which event, the setting would be increased up to substantially 180-inch pounds.

In all other respects, the sleeve valve 10 is the same as shown in my aforesaid copending application to which reference is hereby made, and the subject matter thereof is hereby incorporated into the present disclosure by reference, insofar as consistent with the present disclosure. The sleeve valve 10 additionally includes a core 27 which includes a plurality of peripherally located rounded core elements 28 which are disposed adjacent to the sleeve 25 when the latter is in its relaxed position. The peripheral core elements 28 may be supported and connected to each other by a spider screwed to supporting lugs 29. In the preferred form of my invention, the spider comprises three radial webs 30, the peripheral core elements 28 being integrally formed with the webs 30 and constituting the outer edges thereof. The common meeting point of the webs 30 is filleted as at 31 so as to avoid any sharp bend in the sleeve as it is expanded into the dotted line position shown in FIG. 2.

The peripheral core elements 28 divide the sleeve into three separate segments, each of which is extensible from the solid line position into the dotted line position of FIG. 2. An annular chamber 32 is provided at the middle part of the cylindrical casing 14 into which air may be introduced by means of an inlet nipple 33, thus expanding the three segments of the sleeve into the valve closed position. A quick exhaust, or a safety valve, not shown, may be mounted on the exhaust nipple 34.

As pointed out in the aforesaid copending application, this sleeve valve is particularly well adapted for use in bag filling machines which handle granular materials, for the reason that the progressive expansion of the several segments of the sleeve valve exerting a particle entrapping action on the freely falling granular particles which pass through the valve passageway. The core structure prevents the development of any creases, wrinkles, or folds, as would be a source of gas leakage from the conditioning chamber upwardly into the supply hopper after the valve has been closed and the bag filling operation has commenced, and this result is also due to the self sealing or occluding action exerted by the sleeve on any entrapped granular particles which are caught between a sleeve segment and a backing web 30.

An important feature of my invention is the fact that the cylindrical flanges 21, 22, in addition to confining the sleeve ends 16 in a manner which prevent slippage, serve to reinforce the respective plates 17 and 19 in a particular manner.

In the arrangement shown, each plate is held down at only three points. Nevertheless, due to the reinforcement provided by the cylindrical flanges 21, 22, the compressive force applied by the studs 24 is uniformly distributed all around the inner periphery of the plates, so that the degree of compression of the folds 18, 20 is substantially uniform at all points. This permits me to use only a moderate pressure for sealing purposes, and it also provides the bridging action between the studs which prevents the cutting of the sleeve at intermediate points due to increased loading, even through the lock or stop nuts 26 would prevent cutting at points in the vicinity of the studs 24.

Although only a preferred embodiment of my invention has been shown and described herein, it will be understood that various modifications and changes may be made in the construction shown without departing from the spirit of my invention, as pointed out in the appended claims.

I claim:

1. A sleeve valve comprising a substantially cylindrical casing, a rubber sleeve disposed interiorly of said casing and of a length greater than the length of said casing, the ends of said sleeve being folded back and overlapping the cylindrical portions of the ends of said casing, annular end plates engaging said sleeve at the fold points where it is folded back over the end portions of said casing, means drawing said end plates against the casing ends to provide a gas-tight seal between said casing ends and said sleeve, inlet means for introducing a fluid between said sleeve and said casing to extend said sleeve, and stop means reacting directly on said casing for limiting the pressure exerted by said end plates on said fold points, whereby a compressive force applied to said end plates in an axial direction will be transmitted directly from said end plates to said cylindrical casing without affecting said fold points.

2. A sleeve valve as claimed in claim 1 in which said end plates each have a cylindrical flange externally surrounding and confining the folded back ends of said sleeve.

3. A sleeve valve as claimed in claim 1 in which said means for drawing said end plates against said casing ends comprise a lug on said casing, and screw threaded means connecting said end plates and said lug, and in which said stop means includes a stop nut mounted on said screw threaded means and engaging said lug.

4. A sleeve valve comprising a vertically oriented, substantially cylindrical casing, a rubber sleeve disposed within said casing and having a length greater than the length of said casing, the end portions of said sleeve being folded over the top and bottom edges of said casing and overlapping cylindrical portions of the ends of said casing, a top annular plate overlying the top fold of said sleeve, and a bottom annular plate overlying the bottom fold of said sleeve, a core including peripherally located vertically extending core elements disposed within said sleeve, said peripheral core elements being located adjacent said sleeve when in its relaxed position, means for introducing a fluid into the space between said sleeve and said cylindrical casing to extend said sleeve inwardly of said casing, and means for urging said annular plates against the folds of said sleeve to provide a gas tight seal between said sleeve and the top and bottom edges of said casing, said plate urging means comprising two sets of lugs, one for each plate, projecting radially outwardly from said casing, a plurality of studs secured to each of said end plates, one stud for each lug, said studs extending through said lugs, a draw nut for each stud for drawing said annular plates against said sleeve folds, and a stop nut for each stud for transmitting axial compressive stresses from said annular plates to said cylindrical casing without substantially increasing the force exerted by said end plates on said folds as determined by the cooperation of said drawn nuts and said lugs.

5. A sleeve valve comprising a substantially cylindrical casing, a rubber sleeve disposed within said casing and having a length greater than the length of said casing, the end portions of said sleeve being folded over the two end edges of said casing and overlapping cylindrical portions of the ends of said casing, annular end plates overlying the folds of said sleeve, a core structure including peripherally located core elements disposed within said sleeve, said peripheral core elements being located adjacent said sleeve when in its relaxed position to divide said sleeve into a plurality of separate extensible segments, means for introducing a fluid into the space between said sleeve and said cylindrical casing to extend said sleeve segments inwardly toward the center of said casing, and means for urging each annular end plate against the adjacent fold of said sleeve to provide a gas tight connection between said sleeve and the end edges of said casing, each said plate urging means comprising a set of lugs projecting radially outwardly from said casing, a plurality of studs secured to said end plate, one stud for each lug, said studs extending through said lugs, a draw nut for each stud engaging the remote surface of its associated lug for drawing said end plate against said adjacent sleeve fold, and a stop nut for each stud engaging the proximate surface of its associated lug for transmitting axial compressive stresses from said end plate to said cylindrical casing without substantially increasing the force exerted by said end plate on said adjacent fold as determined by the cooperation of said draw nuts and said lugs.

6. A sleeve valve as claimed in claim 5 in which said core structure comprises a spider having a plurality of radially disposed webs, the edges of said webs extending for substantially the full length of said casing and constituting said peripheral core elements.

7. A sleeve valve as claimed in claim 6 in which the edges of said webs are rounded and the central angles formed by the intersection of said webs are filleted.

8. A sleeve valve as claimed in claim 5 in which the end edges of said casing are rounded.

References Cited by the Examiner

UNITED STATES PATENTS

| 1,778,532 | 10/30 | Meiklejohn | 220—63 |
| 2,766,765 | 10/56 | Bolanowski | 251—5 XR |
| 3,039,733 | 6/62 | Mattioli | 251—5 |
| 3,103,300 | 9/63 | Lau | 251—5 XR |

FOREIGN PATENTS

| 68,948 | 1958 | France. |

ISADOR WEIL, *Primary Examiner.*

WILLIAM F. O'DEA, *Examiner.*